United States Patent [19]

Lair

[11] Patent Number: 5,224,342
[45] Date of Patent: Jul. 6, 1993

[54] LATCHING AND SEALING ARRANGEMENT FOR JET ENGINE THRUST REVERSER

[76] Inventor: Jean-Pierre Lair, 8023 Vantage, Suite 1450, San Antonio, Tex. 78230

[21] Appl. No.: 835,216

[22] Filed: Feb. 13, 1992

[51] Int. Cl.$^5$ .............................................. F02K 1/00
[52] U.S. Cl. ................................. 60/230; 244/110 B; 239/265.33
[58] Field of Search ............................ 60/226.2, 230; 244/110 B; 239/265.27, 265.33

[56] References Cited

U.S. PATENT DOCUMENTS

| | | | |
|---|---|---|---|
| 3,266,734 | 8/1966 | Gahagan et al. | 244/110 B |
| 3,616,648 | 11/1971 | Weise | 239/265.33 |
| 4,212,442 | 7/1980 | Fage | 60/230 |
| 4,424,669 | 1/1984 | Fage | 244/110 B |
| 4,485,970 | 12/1984 | Fournier et al. | 244/110 B |
| 5,040,730 | 8/1991 | Hogie et al. | 60/230 |

*Primary Examiner*—Richard A. Bertsch
*Assistant Examiner*—Howard R. Richman
*Attorney, Agent, or Firm*—Harold H. Dutton, Jr.

[57] ABSTRACT

A thrust reverser for jet engines comprising a pair of thrust reverser doors pivotally mounted on an axis which is substantially diametrically positioned with respect to the exhaust nozzle of a jet engine so as to pivot between a stowed position in which the doors are out of the direct path of exhaust of the engine but subjected to the static pressure of the jet engine over substantially the entire length of the doors, and a deployed position in which the doors are in the path of the engine exhaust for deflecting the exhaust and creating a braking thrust, a latch mechanism for securing the doors in the stowed position, a suitable port for directing a portion of the static pressure of the jet engine toward the doors for exerting the static pressure against the doors, an actuator for releasing the latch mechanism so that the doors may pivot to the deployed position, a valve operatively associated with the latch mechanism for relieving at least a portion of the static pressure of the jet engine acting on an upstream portion of the doors when the latch actuator is actuated, the latch actuator being incapable of releasing the latch until the static pressure is relieved from at least a portion of the doors.

14 Claims, 6 Drawing Sheets

FIG. 1

(PRIOR ART)

FIG. 1A

(PRIOR ART)

FIG. 2

(PRIOR ART)

LATCHING AND SEALING ARRANGEMENT FOR JET ENGINE THRUST REVERSER

This invention relates to a thrust reverser for jet engines, especially the type used in aircraft. More particularly, this invention relates to an improved latching mechanism and sealing arrangement for use with aircraft thrust reversers.

BACKGROUND AND OBJECTS OF THE INVENTION

In order to reduce the landing distance of a jet engine powered aircraft, as well as to increase the margin of safety when the aircraft is landing on a wet or icy runway, thrust reversers are utilized on the jet engines in order to provide a braking thrust for the aircraft. Typically, such thrust reversers are formed by a pair of thrust reverser "doors" which are capable of pivoting between two positions about an axis which is transverse to and substantially diametrical with respect to the jet of the engine. A pair of half-shells are pivotally mounted so as to surround the reverser doors and are positioned rearwardly thereof and with the doors form the exhaust nozzle in the stowed position. When deployed, the half-shells move downstream, behind the reverser doors and out of the path of the exhaust.

The first position finds the doors in a stowed position, out of the direct path of the exhaust blast of the engine. In this position, the doors and the half-shells form the exhaust nozzle of the gas turbine engine so that the thrust of the engine is directly rearward, thereby producing the forward thrust of the aircraft. In the second position, the doors have been pivoted about the pivot axis to a transverse, blast deflecting or deployed position, to intercept and redirect the jet blast and produce the braking thrust for the aircraft when needed.

Because of the effect that the thrust reversers have on the propulsion forces, it is essential that the doors not be able to deploy except on command. To accomplish this, latching systems have been developed to provide the needed margin of safety.

For example, French patent 2,494,175 and U.S. Pat. No. 4,422,605 describe a thrust reverser system which cannot deploy unless the engine rating is close to idle. To fulfill the operating criteria of this type of thrust reverser, the unlatching sequence is the key element. These patents describe in detail that it is necessary to bring the reverser doors to a super-retracted position with respect to their folded or stowed position, in order to unlock these doors. The doors can be brought from their folded or stowed position to their super-retracted position only when the speed of the engine is lower than a certain threshold, close to idling power.

Such a system provides a relatively good protection against inadvertent, in-flight deployment, since the deployment of the thrust reverser doors can only be achieved in a restricted flight envelope. However, such a system has a particular drawback which arises in so far as safety on the ground is concerned, in having to wait until the engine speed has actually spooled down to, or close to idle, before the control actuators for the reverser doors can operate to actually bring the doors from their folded position to their super-retracted position, in order to unlatch the latches, and thereafter allow deployment of the thrust reverser.

In the normal landing mode, this operational sequence for the thrust reverser is not a problem, and indeed the thrust reverser operates precisely in the manner intended. In other words, in a normal landing mode, the engine is already spooled down close to idle speed when the thrust reverser is deployed.

The drawback arises in the case of an aborted take-off, when it is essential that the thrust reverser be capable of being deployed as quickly as possible, and particularly so on a wet or icy runway. Too much elapsed time between the command to deploy and the beginning of actual deployment sequence may very well lead to a catastrophic event, as the aircraft may run off of the runway.

A further drawback of the prior art resides in the fact that when the thrust reverser doors are brought from their stowed position to their super-retracted position, the controlling actuator(s) must counteract parasitic loads which have nothing to do with the predetermined threshold value under which the deployment sequence can be initiated. These parasitic loads, which essentially arise from the compression of the seals when the thrust reverser doors are brought from their folded or stowed position to their super-retracted position, can take as much as 40% of the available hydraulic or pneumatic pressure, leaving only 60% of the pressure to counteract the true load acting on the reverser doors.

Thus, a primary object of the present invention is to provide a latching mechanism for a thrust reverser which ensures complete operational safety of the thrust reverser by completely preventing inadvertent in-flight deployment, while allowing rapid deployment on the ground.

Another object of the invention is to provide a thrust reverser which significantly reduces the elapsed time between the command for deployment of the thrust reverser and actual deployment.

DESCRIPTION OF THE INVENTION

According to the present invention, when the reverser doors are in the folded or stowed position, substantially the complete structure of the reverser doors and of the half-shells is subjected to the static pressure of the jet exhaust, so that the latching mechanism which maintains the reverser doors in their folded position cannot counteract the static pressure load acting on the reverser doors. Therefor, the doors cannot be unlatched, and as a result the thrust reverser cannot be deployed.

In order to unlatch and deploy the thrust reverser, the static pressure acting on the upstream portion of the reverser doors is released or vented to the atmosphere, so that the latching mechanism can counteract the pressure load now acting only on the downstream end of the reverser doors, and can therefor be unlatched and consequently the deployment of the reverser can take place.

Thus, the invention is particularly useful for ensuring operational safety of the thrust reverser by preventing inadvertent in flight deployment, and yet allowing rapid deployment on the ground, even at high engine rating.

DESCRIPTION OF THE DRAWINGS

The invention will now be described with particular reference to the accompanying drawings, which show by way of non-limiting examples, the preferred features and embodiments of the invention. In the drawings which form an integral part of the present description.

DETAILED DESCRIPTION OF PREFERRED EMBODIMENTS

Figure 1:
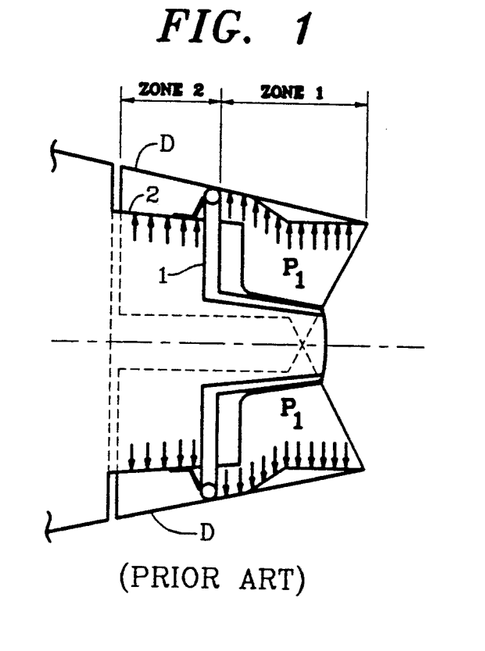
FIG. 1 is a longitudinal cross-sectional schematic view of a prior art thrust reverser in the folded position.

Referring firstly to FIG. 1 which shows the thrust reverser configuration according to the prior art, it is seen that only the area indicated as Zone 1 of the thrust reverser doors D is pressurized by the engine jet. Zone 2 is subject to ambient pressure, meaning that $\Delta P$ in Zone 2 is nil. In the design process of the thrust reverser, the designers have to choose a compromise in order to get good protection against inadvertent inflight deployment and relatively good deployment time characteristics on the ground. This compromise is generally reached by moving the location of the seal assembly 1 on the jet pipe 2, i.e. by increasing or decreasing the length of Zone 1 which is the area of the thrust reverser door subject to the engine jet pressure $P_1$.

Figure 1A:
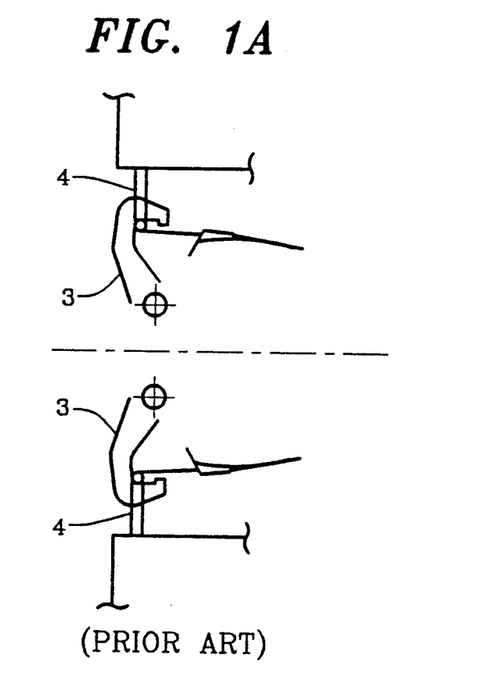
FIG. 1a is an enlarged fragmentary schematic view of the latching mechanism of FIG. 1.

FIG. 1a show that the latch 3 is engaged in the corresponding fixed or rigid receptacle 4 when the reverser is in the configuration of FIG. 1.

Figure 2:
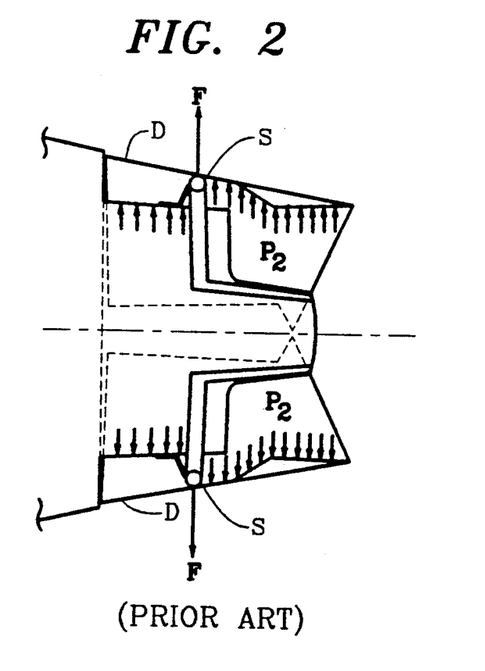
FIG. 2 is a longitudinal cross-sectional schematic view of a prior art thrust reverser in the super-retracted position.
Figure 2A:
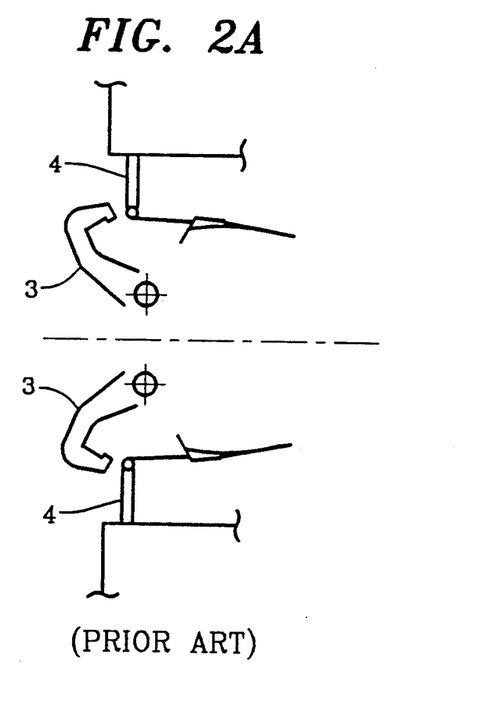
FIG. 2a is an enlarged fragmentary schematic view of the latching mechanism corresponding to FIG. 2.

Referring now to FIG. 2, the main actuators (not shown) 30, have moved the reverser doors to their super-retracted position, so that the latches 3 (FIG. 2a) can disengage from the receptacle 4. This super-retracted position can only be achieved when the pressure P acting on the doors has reached a minimum value $P_2$ which is a function of the engine rating. This threshold $P_2$ is reached when the engine RPM has spooled down close to idle. FIG. 2 also shows that the parasitic loads F arising from the compression of the seal S must be counteracted.

Thus, the drawbacks of the prior art thrust reversers can be summarized with respect to three criteria.

First, the actuators controlling the reverser position are necessarily limited in power, which leads to increasing the lapsed time needed for the doors to be capable of moving to their super-retracted position.

Secondly, the actuators must counteract parasitic loads on top of the normal load for which they are designed. These parasitic loads can take a much as 40% of the available power, leaving only about 60% of the available power for acting on the reverser doors to open them.

Thirdly, there is asymmetric deployment of the reverser door on the ground, as the engine deceleration is not symmetrical. This can lead to aircraft control problems on the ground.

Figure 3:
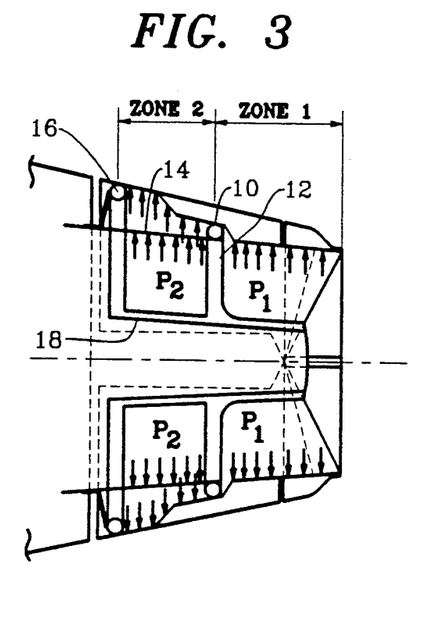
FIG. 3 is a longitudinal cross-sectional schematic view of a thrust reverser according to the present invention showing the pressure distribution acting on the doors in flight.

With reference to FIG. 3, the complete structure of the thrust reverser door and the associated half shell is subjected to the internal jet engine static gas pressure. The thrust reverser door is formed of two zones which are essentially defined by two radial seals. Seal 10 is located at the trailing edge 12 of the jet pipe 14, and downstream of seal 10 is Zone 1 in which the static pressure $P_1$ acts on the thrust reverser door and the half shell. Seal 16 is upstream of seal 10, and between seal 10 and seal 16 there is a volume defined essentially by the jet pipe 14, the thrust reverser door structure, the radial seals 10 and 16, and the longitudinal seal 18. This volume, referred to as Zone 2, is subjected to the same static pressure $P_2$ as that acting in the jet pipe 14. The static pressure shown in FIG. 3 corresponds to the configuration of the aircraft in flight.

Figure 3A:
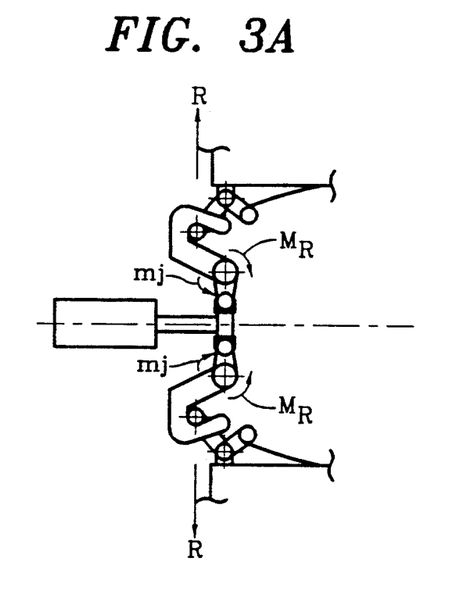
FIG. 3a is an enlarged fragmentary schematic view of the latching mechanism corresponding to FIG. 3, showing the rotational moments applied to the latches.

Whenever the static pressure is acting on zones 1 and 2, there is no possibility of disengaging the latches from their receptacles. FIG. 3a explains why this is the case. The rotational moment $M_R$, applied to the pivoting axis of the latches, and produced by the reaction R (acting on the latch receptacle) from the integration of the static pressure distribution acting in zones 1 and 2 is much greater than the rotational moment $m_j$ which can be produced by the latching actuator.

Figure 4:
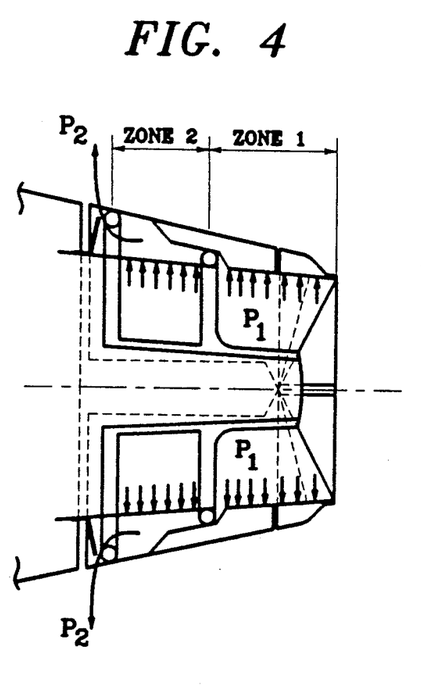
FIG. 4 is a longitudinal cross-sectional schematic view of a thrust reverser with the pressure distribution acting on the 30,, doors when the aircraft is ready to deploy the thrust reverser.
Figure 4A:
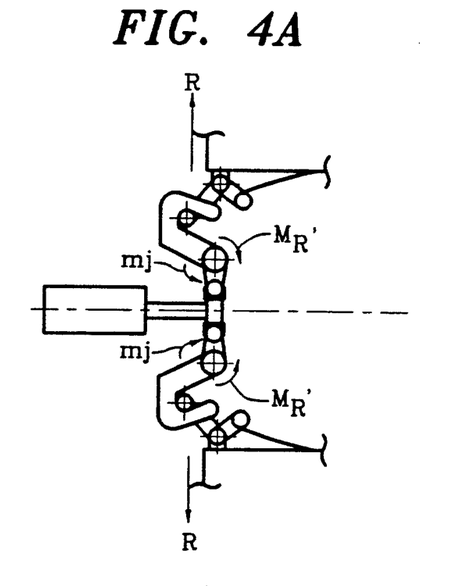
FIG. 4a is an enlarged fragmentary schematic view of the latching mechanism showing the rotational moments applied to the latches corresponding to FIG. 4.

Referring now to FIG. 4, the static pressure $P_2$ which was acting in zone 2 is released to ambient so that there is no longer any pressure differential in zone 2. Only zone 1 is subjected to the jet engine static pressure $P_1$. This pressure distribution configuration corresponds to the landing or aborted take-off circumstances. FIG. 4a shows that the rotational moment $M_R'$ acting on the pivot axis of the latches and produced by the reaction R of the integration of the static pressure acting in zone 1 only, is this time much smaller than the rotational moment $m_j$ produced by the latching actuator. In comparison to FIG. 3, the rotational moment $_R'$ is reduced by an excess of approximately 80%. Therefor, the latch can be controlled to disengage the receptacle and allow deployment of the reverser doors.

Figure 5:
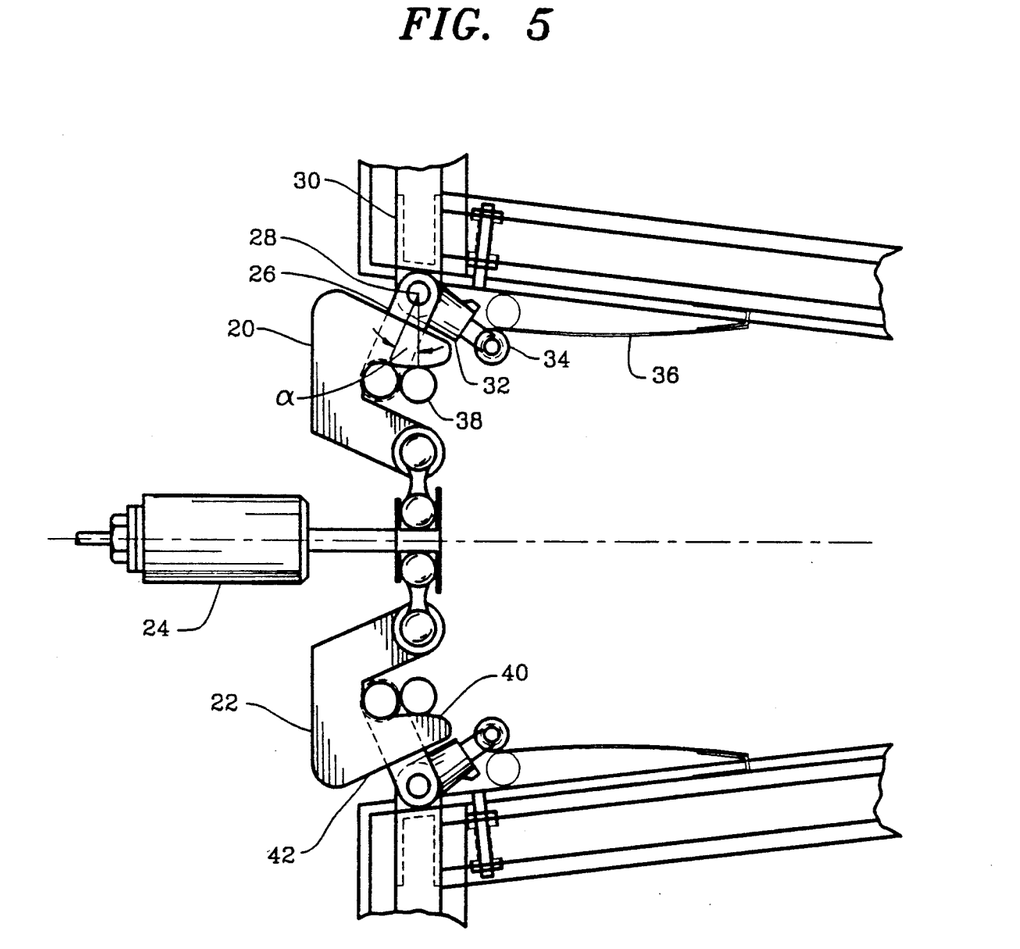
FIG. 5 is an enlarged fragmentary sectional view showing the latching mechanism with the aircraft in flight.

FIG. 5 shows the details of the latching mechanism, it being understood that there are four latches per thrust reverser, two on each side. According to the present invention, a pair of latches 20 and 22 on one side of the thrust reverser are controlled by a single actuator 24, for example a hydraulic or pneumatic piston and cylinder actuator. Each latch receptacle 26 can rotate about an axis 28 through an angle $\alpha$, and the axis is pivotally mounted to the reverser door structure 30 so as to permit such rotational movement. Each latch receptacle 26 has an arm 32, the end 34 of which can roll or slide on a leaf spring 36 attached to the reverser door structure. The leaf spring 36 is spring loaded to urge the latch receptacle 26 toward the position shown in FIG. 5, i.e. engaged in the throat of the latches.

In addition to the structural function of maintaining the structural integrity of the thrust reverser doors when in the stowed position, the design of the latches is such that they cannot disengage from their receptacles 26 for any angular position of the receptacles 26. For example, in case of failure of one leaf spring 36, the corresponding latch receptacle could reach its other extreme position 38 only if the pressure loading on the reverser door is low enough, but would not be able to disengage from the latch 20.

According to another feature, the actuator 24 cannot rotate the latch unless the static pressure distribution in zone 2 (FIG. 4) has been released. The shape of the ramp 40 on the inner portion of the latch also contributes to preventing the latches from disengaging their respective receptacles. This ramp is a portion of a circle centered on the rotational axis 28 of the latch receptacle 26. This means that when the pressure loading acting on the reverser doors is as shown in FIG. 3, the latch receptacle 26 remains engaged in the throat of the latch, and in addition, the latch cannot rotate, as there would be mechanical interference between the ramp and the latch receptacle.

Another important feature of the latches according to the present invention is the ramp surface 42 located on the outside of the latch members 20 or 22. This ramp or cam surface 42 permits automatic re-engagement of the latch receptacles and the latches when the reverser doors move from the deployed position to the stowed position.

Figure 6:
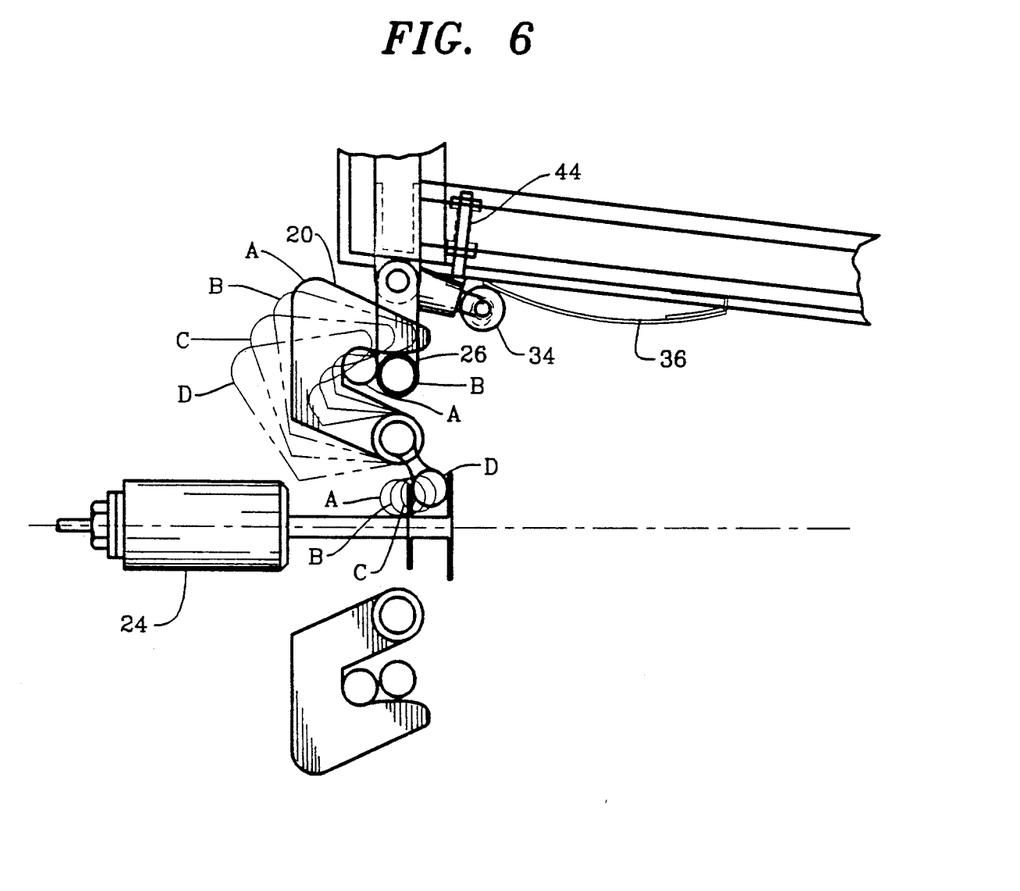
FIG. 6 is an enlarged fragmentary sectional view showing the latching mechanism moving toward its unlatched position.

With reference now to FIG. 6, the pressure distribution acting on the thrust reverser doors is assumed to be as illustrated in FIG. 4. That is, there is no static pressure acting in zone 2. The actuator 24 can therefor produce a rotational moment $m_j$ which is much greater than the rotational moment $M+_R$ generated by the pressure acting in zone 1 (FIGS. 4 and 4a). When the actuator moves the latch from position A to position B, the internal ramp 40 moves the latch receptacle from position A to position B as shown in FIG. 6. This in turn flexes the leaf spring 36 to its limit, and the latch receptacle 26 which has reached position B is limited in its travel by stop 44.

The control actuator 24 must at least reach position C in order for the latch receptacle, which is at position B, to clear the latch and allow the reverser doors to deploy. The leaf springs 36 always tend to urge the latch receptacle against the latch, in order to return to its other extreme at position A, while the latch 20 reaches position D.

The actual deployment of the reverser doors can start as early as position C or as late as position D as seen in FIG. 6. This therefor permits an adjustment of the beginning of the thrust reverser deployment, and can be set by microswitches (not shown) which could be used to detect the position of the latch and send a signal to the actuator controlling the deployment of the doors, commanding the actual deployment.

When the thrust reverser doors reach the fully deployed position, the latch actuator 24 is depressurized (if single acting), meaning that by spring return, the latch actuators bring back the latches to their initial position A. It will be understood, however, that a double acting latch actuator 24 could also be used, in which case the latch would remain in position D until the reverser doors reach their stowed position. The latching actuators would then positively drive the latches to their initial position A, engaging the latch receptacles.

Figure 7:
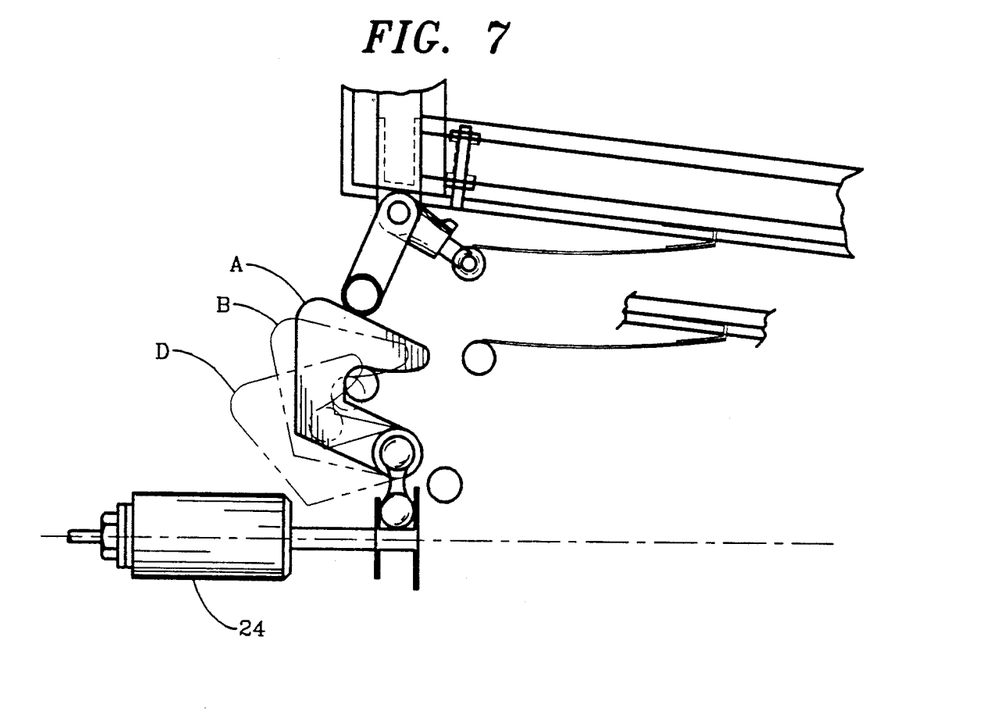
FIGS. 7 and 8 are enlarged fragmentary sectional views of the latching mechanism moving from the unlatched position to the fully latched position.

With reference to FIG. 7, the reverser doors move from their deployed position to their stowed position. During this movement, the latch receptacle comes into contact with the external ramp 42 of the latch, forcing the latch to rotate to respective intermediate position B, and extreme position D. The reverser doors have then reached their stowed position, but are not yet latched in place.

Figure 8:
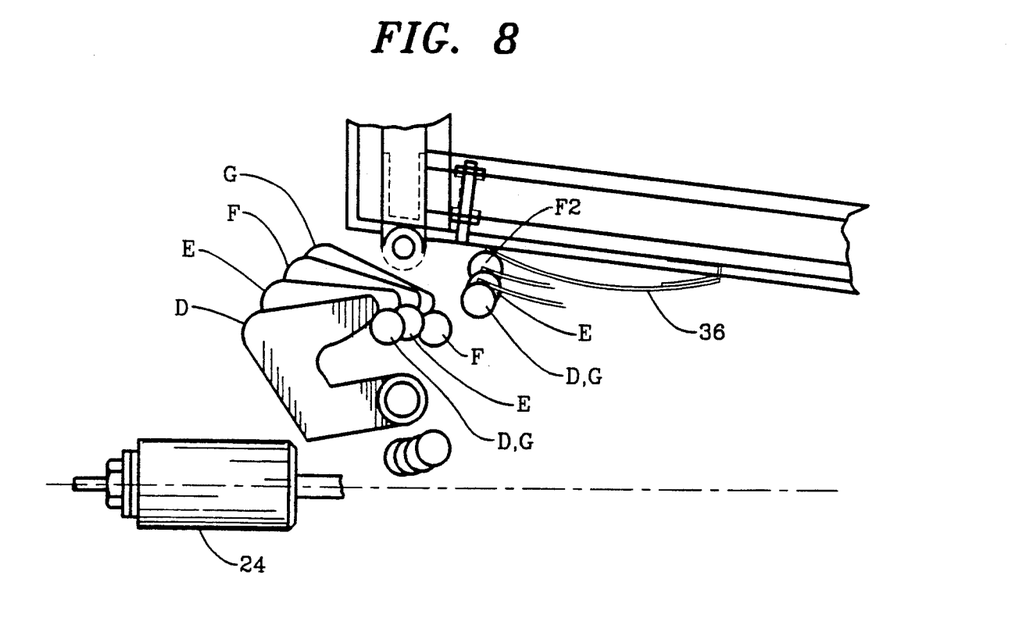

As illustrated in FIG. 8, the latches which are in position D are caused to return by the return stroke of the actuator 24, and push the latch receptacle 26, causing it to rotate about the pivot axis 28 against the bias of the leaf spring 36. When the latches reach position G, the latch receptacles 26 are returned to their latching position G by the action of the spring 36.

Figure 9:
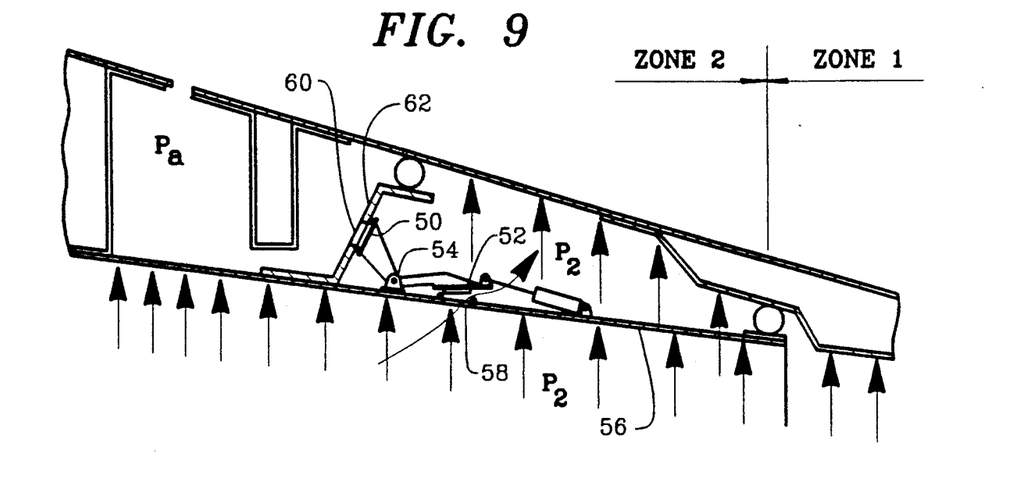
FIG. 9 is a longitudinal cross-sectional view of the forward portion of a thrust reverser door showing the static pressure distribution corresponding to FIG. 3.

Turning to FIG. 9, the complete thrust reverser door structure is subjected to the engine jet static pressure, as discussed with reference to FIG. 3. More particularly, zone 2 is subjected to the static pressure $P_2$. It will be apparent that zone 2 may be pressurized in several ways. The arrangement shown in FIG. 9 illustrates two valves 50 and 52, connected together and pivotally mounted on a fitting 54 attached to the jet pipe 56. A bleed port 58 is installed on the jet pipe 56, so that when opened, zone 2 can be pressurized. The valve 52 is spring loaded to the opened position, and valve 50 closes the port 60 installed on the seal retainer 62.

Figure 10:
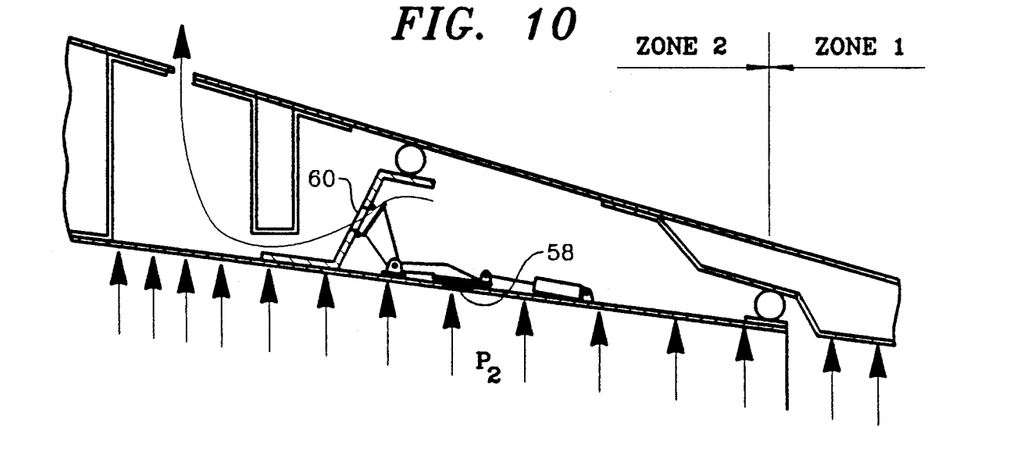
FIG. 10 is a longitudinal cross-sectional view of the forward portion of a thrust reverser door showing the static pressure distribution corresponding to FIG. 4.

Referring to FIG. 10, zone 2 is depressurized by closing port 58 and opening port 60. Only zone 1 remains pressurized as in FIG. 4. This feature of the invention enables the pressure distribution acting on the thrust reverser door to be significantly reduced so that the reverser latches can be disengaged from their associated receptacles, and in turn to allow deployment of the thrust reverser.

Figure 11:
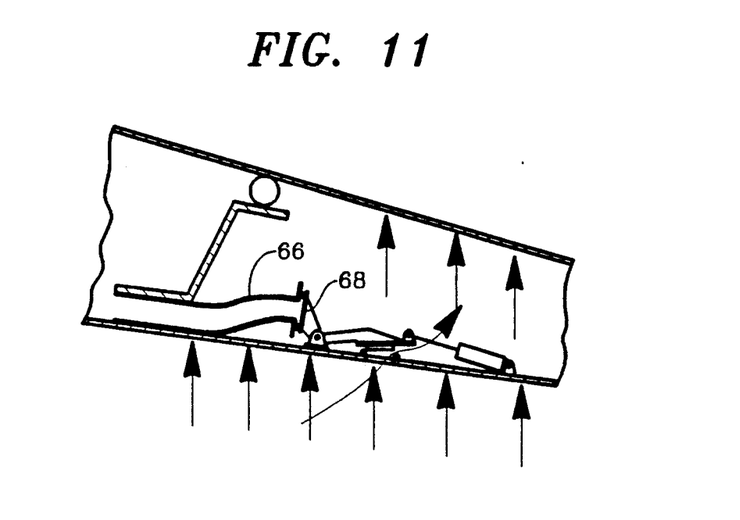
FIG. 11 is a view similar to FIG. 9 showing an alternative embodiment.

The valves 50 and 52 can be electrically controlled by a solenoid, so that the solenoid will be energized only when it is necessary to release the static pressure in zone 2 to the atmosphere (FIG. 10). Further, although FIGS. 9 and 10 show the port 60 to be installed on the seal retainer 62, other configurations are possible, as for example the configuration shown in FIG. 11, wherein a conduit 66 is opened by an appropriate valve 68, corresponding to the valve 50.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. A thrust reverser for jet engines comprising a pair of thrust reverser doors pivotally mounted on an axis which is substantially diametrically positioned with respect to the exhaust nozzle of an engine so as to pivot between a stowed position in which said doors are out of the direct path of exhaust from the engine, and a deployed position in which said doors are in the path of the engine exhaust for deflecting the exhaust and creating a braking thrust, latch means for securing said doors in said stowed position, means for directing a portion of the static pressure of the jet engine toward said doors for exerting the static pressure against said doors, latch actuator means for releasing said latch means so that said doors may pivot to said deployed position, means operatively associated with said latch means for relieving at least a portion of the static pressure of the jet engine acting on an upstream portion of said doors when said latch actuator means is actuated, said latch actuator being incapable of releasing said latch until means said static pressure is relieved from at least a portion of said doors.

2. A thrust reverser for jet engines as in claim 1 and including seal means coacting with said doors and the jet engine for establishing an upstream zone and a downstream zone along said doors for receiving said static pressure from said jet engine.

3. A thrust reverser for jet engines as in claim 2 and including means for directing static jet pressure to both of said zones, so that when static jet pressure is present in both of said zones said latch actuator means is incapable of releasing said latch means.

4. A thrust reverser for jet engines as in claim 3 and wherein said static pressure relieving means includes means for releasing pressure from the upstream zone, so that when pressure is released from said upstream zone said latch actuator means is operable to release said latch means.

5. A thrust reverser for jet engines as in claim 4 and wherein said means for releasing gas pressure from the upstream zone comprises a port and a valve member operative for opening or closing said port upon command.

6. A thrust reverser for jet engines as in claim 4 and wherein said latch means includes a latch member pivotally secured to the jet engine and an associated latch receptacle pivotally secured to the reverser door, said latch receptacle being pivotal between a latching position and a release position.

7. A thrust reverser for jet engines as in claim 6 and wherein each of said latch members includes an internal ramp portion comprising a circular arc centered on the pivot axis of the latch receptacle.

8. A thrust reverser for jet engines as in claim 6 and wherein each of said latch members includes an external ramp portion so configured as to enable reengagement of said latch member with the associated latch receptacle upon return of the reverser doors to the stowed position.

9. A thrust reverser for jet engines as in claim 2 and wherein said seal means comprises two radial seals and a longitudinal seal connecting said radial seals.

10. A thrust reverser for jet engines as in claim 9 and including a first gas port in said jet engine or supplying static pressure to said downstream zone, and a first valve member for opening or closing said first gas port.

11. A thrust reverser for jet engines as in claim 10 and including a seal retainer separating said upstream zone and said downstream zone, a second gas port in said seal retainer, and a second valve member for opening or closing said second gas port.

12. A thrust reverser for jet engines as in claim 11 and including means connecting said first and second valve members for simultaneous operation.

13. A thrust reverser for jet engines as in claim 12 and wherein said connecting means opens said second gas port when said first gas port is closed.

14. A thrust reverser for jet engines comprising a pair of thrust reverser doors pivotally mounted on an axis which is substantially diametrically positioned with respect to the exhaust nozzle of an engine so as to pivot between a stowed position in which said doors are out of the direct path of exhaust from the engine, and a deployed position in which said doors are in the path of the engine exhaust for deflecting the exhaust and creating a braking thrust, latch means for securing said doors in said stowed position, seals means coacting with said doors and the housing of said engine for establishing upstream and downstream zones between said doors and said jet engine, means for directing a portion of the static pressure of the jet engine toward said upstream zone and said downstream zone for exerting the static pressure against said doors in said zones, latch actuator means for releasing said latch means so that said doors may pivot to said deployed position, means operatively associated with said latch means for relieving at least a portion of the static pressure of the jet engine acting on said upstream zone when said latch actuator means is actuated, said latch actuator means being incapable releasing said latch until said static pressure is relieved from at least said upstream zone.

* * * * *